UNITED STATES PATENT OFFICE.

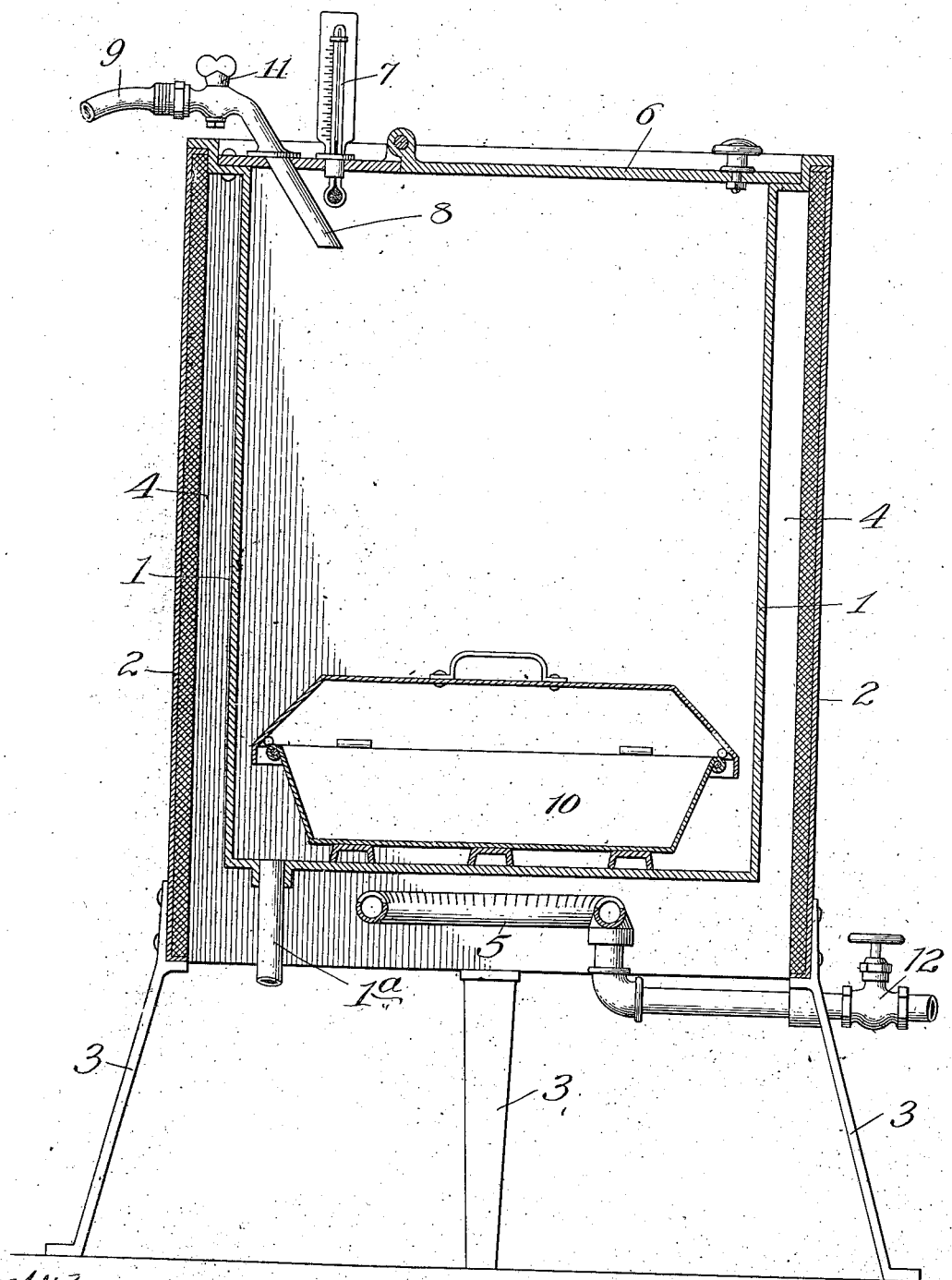

CHARLES B. TRESCOTT, OF CHICAGO, ILLINOIS, ASSIGNOR, BY MESNE ASSIGNMENTS, TO AUTOMATIC OVEN COMPANY, OF CHICAGO, ILLINOIS, A CORPORATION OF ILLINOIS.

ART OF COOKING.

1,192,802.  Specification of Letters Patent.  Patented July 25, 1916.

Application filed May 7, 1915. Serial No. 26,530.

*To all whom it may concern:*

Be it known that I, CHARLES B. TRESCOTT, a citizen of the United States, residing at Chicago, in the county of Cook and State of Illinois, have invented a new and useful Improvement in the Art of Cooking, of which the following is a specification.

My invention relates, more particularly stated, to an improvement in the art of low-temperature cooking. In that art the temperature employed is essentially below that for boiling water (212° F.). For cooking meats the maximum is about 180° F., and for cooking vegetables the maximum is about 200° F. The advantage of this method of low-temperature cooking lies, as to meats, in its effect of gradually breaking down the fibrous matter and preventing toughening and hardening of the albumen, also retaining the natural flavor; and with regard to vegetables the advantage lies in retaining their natural flavor. There is, however, a disadvantage in the common practice of low-temperature cooking, namely, that of lack of sufficient heat-units and moisture to thoroughly cook meats and prevent their shrinking and drying through evaporation and that of very imperfectly cooking vegetables.

The object of my invention is to overcome these and other disadvantages in low-temperature cooking, and to enable meats to be cooked thoroughly and properly without shrinking while retaining their juices and flavor, and to enable vegetables to be cooked properly without depriving them of their natural flavor. This I accomplish, generally stated, by spraying into the heated atmosphere of a low-temperature oven, water in a very finely-divided condition, and in quantity sufficient to saturate the heated air, thereby providing a superfluity of the water as a vehicle for carrying the heat-units which attack the material undergoing cooking in the oven in a loosely-covered container, and gradually effecting the cooking thereof with the advantages above mentioned.

The accompanying drawing shows, by a vertical sectional view, an oven equipped with a water-spraying nozzle and suitable for the practice of my invention.

The oven shown comprises a sheet-iron chamber 1 surrounded by a sheet-iron jacket 2 supported on legs 3 and forming a space 4 about the chamber for the heat from a suitable heater 5, shown as a gas-burner. A hinged lid 6 is provided for closing the oven at its top, while in use, and a thermometer 7 is shown on the top of the oven. A water-spraying nozzle 8 extends through the oven-top and is connected by a hose 9 with a suitable water-supply under pressure (not shown).

With the oven heated to the low temperature hereinbefore referred to, and the meat, vegetables, or the like, to be cooked therein in a loosely-covered container 10, or other covered vessel, the water supply is turned on to spray water in a finely-divided condition into the upper part of the oven. This fine spray is maintained continuously throughout the cooking operation and is sufficiently copious to saturate the hot air, itself forming a vehicle for the heat-units, with which it becomes charged in dropping through the rising hot air, whereby in dropping and enveloping the container it carries the heat thereto. An outlet for the water is shown at 1ª.

The importance of providing the superfluity of water in a finely-divided condition by saturating therewith hot air, lies in affording an augmented vehicle for carrying the heat-units to the material undergoing cooking, whereby the latter is cooked to a mellow condition uniformly throughout under the comparatively low temperature, and this with comparative rapidity because of the large number of heat-units.

It is my experience that meat, cooked in accordance with my improved process, retains its full weight (less the juices which exude into the pan and are saved), since there is no evaporation therefrom; and obviously no evaporation can take place into the saturated atmosphere in the oven; that it is thoroughly cooked throughout and extremely tender; and that with regard to vegetables, they are thoroughly cooked and retain in cooking their natural flavor.

This process is to be distinguished from one employing steam sprayed into the oven during cooking, since where steam is so used it is impossible, because of the high degree of its temperature, to maintain the requisite low temperature for the cooking and at the same time attain requisite saturation of the hot air in the oven, since where the supply of steam is sufficiently copious to moisten the air, it overheats the oven, and if the quantity is made insufficient to so overheat the oven it will fail to saturate the air. It is further to be observed that in the present case the heat supply and moisture supply are separate and under separate control (a valve being shown at 11 for controlling the supply of water to be sprayed and a valve being shown at 12 for controlling the heat supply); whereas, in the use of steam, for providing moisture in the oven, it is not only ineffective for that purpose but it also tends to overheat the air in the oven, and to defeat the very object of low-temperature cooking.

What I claim as new and desire to secure by Letters Patent is:

1. In the art of low-temperature cooking, the process which consists in heating the air in an oven, in which the cooking is carried on, to and maintaining it at a temperature below 212° F., spraying into the heated atmosphere water in sufficient quantity to saturate the hot air, and maintaining a continuous supply of the sprayed water throughout the cooking operation.

2. In the art of low-temperature cooking, the process which consists in heating the air in an oven, in which the cooking is carried on, to and maintaining it at a temperature below 212° F., spraying into the top portion of the oven water to drop through the ascending hot air therein and in sufficient quantity to saturate said air, and maintaining a continuous supply of the sprayed water throughout the cooking operation.

3. In the art of low-temperature cooking, the process which consists in introducing into an oven the matter to be cooked in a loosely-covered container, heating the air in the oven to and maintaining it at a temperature below 212° F., spraying into the top portion of the oven water to drop through the heated atmosphere therein and in sufficient quantity to saturate said air, and maintaining a continuous supply of the sprayed water throughout the cooking operation.

CHARLES B. TRESCOTT.

In the presence of—
A. C. Fischer,
D. C. Thorsen.